(12) United States Patent
Michielin et al.

(10) Patent No.: US 7,763,685 B2
(45) Date of Patent: Jul. 27, 2010

(54) METHOD OF DISCHARGING A POLYMER FROM A POLYMERIZATION REACTOR

(75) Inventors: Luciano Michielin, Mantova (IT); Maurizio Dorini, Mantova (IT); Giuseppe Penzo, Mantova (IT); Riccardo Rinaldi, Mantova (IT)

(73) Assignee: Basell Poliolefine Italia s.r.l., Milan (IT)

( * ) Notice: Subject to any disclaimer, the term of this patent is extended or adjusted under 35 U.S.C. 154(b) by 610 days.

(21) Appl. No.: 11/632,745

(22) PCT Filed: Jul. 4, 2005

(86) PCT No.: PCT/EP2005/007257

§ 371 (c)(1), (2), (4) Date: Jan. 18, 2007

(87) PCT Pub. No.: WO2006/007974

PCT Pub. Date: Jan. 26, 2006

(65) Prior Publication Data

US 2007/0213481 A1    Sep. 13, 2007

Related U.S. Application Data

(60) Provisional application No. 60/592,345, filed on Jul. 28, 2004.

(30) Foreign Application Priority Data

Jul. 23, 2004 (EP) .................................. 04103551

(51) Int. Cl.
*C08F 2/00* (2006.01)
*B01J 4/00* (2006.01)

(52) U.S. Cl. .......................... 526/64; 526/901; 526/88; 526/78; 422/131; 422/232

(58) Field of Classification Search .................. 526/88, 526/901, 78, 64; 422/131, 232
See application file for complete search history.

(56) References Cited

U.S. PATENT DOCUMENTS

| 2,507,105 | A | | 5/1950 | Howard et al. |
| 3,709,641 | A | * | 1/1973 | Sarem ............................ 425/7 |
| 6,763,852 | B1 | | 7/2004 | Finkeldei et al. |

FOREIGN PATENT DOCUMENTS

| EP | 006288 | 1/1980 |
| EP | 245043 | 11/1987 |
| EP | 1012195 | 6/2000 |
| EP | 1159305 | 12/2001 |

* cited by examiner

*Primary Examiner*—Robert D. Harlan
(74) *Attorney, Agent, or Firm*—William R. Reid

(57) ABSTRACT

A method of discharging polymer from a continuously operated polymerization reactor, wherein at least a monomer is polymerized to form polymer particles, the method comprising adjusting the discharge rate of the polymer particles by means of a piston valve having a piston element connected to an actuator, said actuator being able to modulate the piston stroke inside said piston valve.

18 Claims, 3 Drawing Sheets

METHOD OF DISCHARGING A POLYMER FROM A POLYMERIZATION REACTOR

This application is the U.S. national phase of International Application PCT/EP2005/007257, filed Jul. 4, 2005, claiming priority to European Patent Application 04103551.0 filed Jul. 23, 2004, and the benefit under 35 U.S.C. 119(e) of U.S. Provisional Application No. 60/592,345, filed Jul. 28, 2004; the disclosures of International Application PCT/EP2005/007257, European Patent Application 04103551.0 and U.S. Provisional Application No. 60/592,345, each as filed, are incorporated herein by reference.

The present invention relates to a method and apparatus for discharging polymer particles from a continuously operated polymerization reactor. In particular, according to the present invention, a piston valve having a specific functional design is applied at the outlet of a polymerization reactor with the aim of finely adjusting the discharge rate of polymer from the reactor.

It is known that the withdrawal of polymer product from a polymerization reactor can be carried out batchwise or continuously. For instance, in case of a gas-phase fluidized bed reactor a typical batch discharge process consists of the following steps: when the surface level within the gas phase reactor rises as a result of polymerization, polymer powder is discharged through an on/off valve to an outlet tank. A part of the fluidizing gas entering the tank with powder is recycled by a compressor back to the fluidized bed, while the degassed powder is recovered and optionally subjected to further processing. However, some serious disadvantages are associated with the batchwise discharge, which is a rather complicated system. It comprises several phases and a number of on/off valves, which typically operate tens of times an hour. There has to be at least two discharge systems, in large polymerization plants even more. This feature makes the batchwise discharge system rather expensive as an investment and also the maintenance is cost-consuming. Moreover, if the batchwise discharge system becomes clogged or there is a serious failure in the system, the whole polymerization plant has to be shut down. As regards the operative point of view, the discontinuous operation of the outlet system leads to a distinct fluctuation in the level of the polymer bed, when a batch of the polymer product is withdrawn from the reactor. This fluctuation influences the monomer concentration and also other parameters, such as the concentration of hydrogen and comonomers, which all taken together have a strong impact on the quality of the polymer product.

The discontinuous operation involves also wide variations of pressure at the valve outlet, thus requiring great volumes downstream the valve in order to reduce any pressure oscillation.

Some discharge systems of polymer powder from a polymerization reactor are described in EP 0006288 and EP 0245043.

In EP 0006288 the discharge is effected via a dip leg, which passes from the top of the reactor to a point near the bottom. The dip leg is connected to an on/off valve, which is opened intermittently. When the valve is open, a mixture of polymer and monomer is passed to a cyclone, where most of the monomer is separated from the polymer.

EP 0245043 teaches an apparatus for degassing and pelletizing polyolefins, in which there is an outlet nozzle equipped with a lock chamber placed between two valves activated alternatively. The mixture of gas and solid particles, withdrawn from the reactor, is treated in a primary degasser for separating the solid phase from a part of the gas phase accompanying the particles. It should be noted that the control valves described in EP 0006288 and EP 0245043 are actually intermittently operated, which means that there is no continuous stream of polymer powder through the outlet nozzles. Thus, these systems are merely improved batch discharge systems having the above described disadvantages.

A continuously operated polymerization reactor can work in a steady and reliable way only if the discharge rate of polymer is continuously adjusted. In fact, even minimal fluctuations on the operating conditions (temperature, pressure, monomers concentration) can considerably increase or decrease the production rate of polymer: as a consequence, a control device placed on the discharge line of the polymer is necessary to maintain stable operation of a polymerization reactor.

Till now piston valves have been deemed unsuitable to be used as control valves on the discharge line of a polymer from a reactor. These valves are commonly used as on-off valves, capable of blocking the flow of a fluid from a vessel to a pipe. The position of the piston inside the valve body can cause or not the passage of fluid through the pipe, the piston being capable of sliding into the valve body between two extreme positions. The first position of the piston does not hinder the passage of fluid through the pipe (position "on"), while the second position totally blocks the passage of fluid through the pipe (position "off"): intermediate operating positions are not contemplated in this type of valve.

Due to this on-off working, piston valves are preferably employed as dumping valves in reactors operated under pressure. By way of example, they can be used in a bulk polymerization process to carry out the dumping of the slurry when the reactor pressure exceeds an upper limit for the safety of the plant: this is a typical application where the adjustment of the flow rate is not required.

For this reason, segmental ball valves or eccentric rotary type valves are commonly used as control valves at the outlet from a polymerization reactor. For instance, according to the disclosure of EP 1159305 free-flowing polymer powder is continuously withdrawn from a fluidized bed reactor via a discharge pipe, while simultaneously monitoring the surface level of the fluidized bed within the gas-phase reactor. The flow of polymeric material through the discharge pipe is controlled, so as to maintain an essentially constant bed level into the reactor. To achieve this aim, the reactor is provided with an outlet nozzle equipped with a continuously operated control valve for the polymer discharge. The discharge system of EP 1159305 comprises an outlet nozzle, a control valve and a bed level indicator: ball valves, V-ball valves and hose valves are mentioned as the continuously operated control valves. Both the discharge line and the control valve are discontinuously backflushed with a flushing gas flow to prevent their clogging.

It should be noted that a segmental ball or eccentric rotary type valve is a valve in which the fluid flow is regulated by a plug (having a hemispheric shape with a special cut) moving relative to a spherical socket as a result of fluid pressure and the opening of the plug itself. The design of this type of valve comprises an adduction zone upstream the spherical socket: therefore, if this type of valve was directly connected to the polymer discharge nozzle on the reactor wall, serious problems would arise in said adduction zone in case of low throughput of the plant or whenever the valve is closed. In fact, after a complete closing of the valve, the reaction medium and the growing polymer particles will continue to flow inside said adduction zone with undesirable polymerization in said zone and consequent clogging of the valve itself.

In order to avoid this drawback, an on-off valve or block valve, such as a piston valve, is usually interposed between the discharge nozzle and the control valve. Therefore, a ball valve or similar rotary type valves with the function of a control valve cannot be directly connected to the polymer discharge nozzle on the reactor wall and generally, at least an on-off valve is placed upstream this type of control valve. Preferably, on-off valves are placed both upstream and downstream the control valve in order to enable maintenance on said valve avoiding the depressurization of the polymerization reactor and of the devices downstream the valve. As a consequence, according to the present industrial technique, the following sequence of valves is generally arranged on the discharge line of the polymer: a first on-off valve, a segmental ball valve or eccentric rotary valve as the control valve, and a second on-off valve. This sequence of valves on the discharge line of the reactor implies some disadvantages.

First, the correct working of this number of valves requires routine and extraordinary maintenance, thus causing an increase in the operating costs of a polymerization plant. Above all, the flow of polymer particles, before reaching the control valve, is obliged to pass through at relatively long piece of pipeline plus at least one on-off valve. This implies that in case of operation at a low productivity, there is a high risk of formation of polymer lumps inside the pipeline or inside the on-off valve, since the entering polymer particles may be not sufficiently cooled down and the polymerization reaction keeps on. The likelihood of such event depends on the residence time of the polymer particles inside the pipeline and the on-off valve. Substantially, in the presently used arrangement (shown in FIG. 1) the distance to be covered from the polymer between the reactor outlet and the control device reduces the flexibility required by the operative needs of the process.

In view of the foregoing, it would be highly desirable to reduce in a polymerization process the distance between the polymerization reactor and the valve which controls the flow of polymer exiting the reactor, with the aim of reducing the risk of plugging the discharge line when the valve is closed for any reason (emergency situation or other reasons implying the closing of the discharge valve).

It has now been found that the insertion on the polymer discharge line of a piston valve working as a modulating valve allows minimizing the risk of plugging the discharge line, with the further advantage of attaining an accurate and prompt control on the flow rate of polymer discharged from the reactor.

Therefore, according to a first object, the present invention provides a method of discharging polymer from a continuously operated polymerization reactor, wherein at least a monomer is polymerized to form polymer particles, the method comprising adjusting the discharge rate of the polymer particles by means of a piston valve having a piston element connected to an actuator, said actuator being able to modulate the piston stroke inside said piston valve.

The method of the present invention can be successfully applied to a polymerization process carried out both in a gaseous and a liquid phase. By this method the control on the polymer particles exiting the reactor is made more accurate and reliable with respect to the prior art. The use of a piston instead of a ball as a control device at the outlet of a polymerization reactor avoids plugging of the discharge line when the valve is closed (i.e. emergency situation), thus minimizing the formation of polymer lumps when the plant is running at a reduced throughput. To this purpose, the design of a piston valve has to be subjected to some changes in order to make it working as a modulating valve. An important modification is given by the connection of the piston to an actuator, which is able to selectively displace the piston inside the valve, thus modulating its stroke.

The structural arrangement of the piston valve of the present invention comprises:
a valve body and a piston element able to slide inside the valve body;
a discharge conduit, and
a specially shaped orifice forming the inlet of said discharge conduit.

Preferably a sleeve is inserted inside the valve body. The piston element is a solid cylinder able to slide inside said sleeve or, if the sleeve is absent, inside the valve body. The position of the piston element may cause or not the passage of polymer through the discharge conduit. The axis of the discharge conduit generally forms an angle from 30° to 90° with the valve axis, preferably from 40° to 60° C. The inlet of the discharge conduit is placed along the axis of the valve at a suitable distance from the inlet of the valve itself. The specially shaped orifice forming the inlet of said discharge conduit allows the attainment of a specific control behavior as explained afterwards.

According to the method of the invention, the piston valve can be directly coupled to the reactor wall on the line of polymer discharge, so that polymer particles suspended in a liquid or gaseous polymerization medium can enter directly the valve. When the valve is closed, the piston element is pushed against the reactor wall, so that the end surface of the piston element is substantially aligned with the reactor wall. As a consequence, no section of valve can be filled by the polymerization material, thus assuring a continuous operability of the discharge line. This is an important advantage versus the ball valves used as control valves, in which after a complete closing of the valve the reaction medium and the growing polymer particles may continue to flow inside part of the valve body, with undesirable polymerization and consequent clogging of the valve itself.

The present invention will be, thereafter, described in more details with reference to the enclosed drawings, which are illustrative and non-limitative of the scope of the invention.

BRIEF DESCRIPTION OF THE DRAWINGS

FIG. 1 shows the sequence of valves usually arranged, according to the prior art, on the discharge line 10 of a polymer withdrawn from a polymerization reactor. The polymerization reactor is a fluidized bed reactor 1 comprising a fluidized bed 2 of polymer, a fluidization plate 3, a velocity reduction zone 4 and a recycle line 5 of the gaseous monomers.

Figure 1:
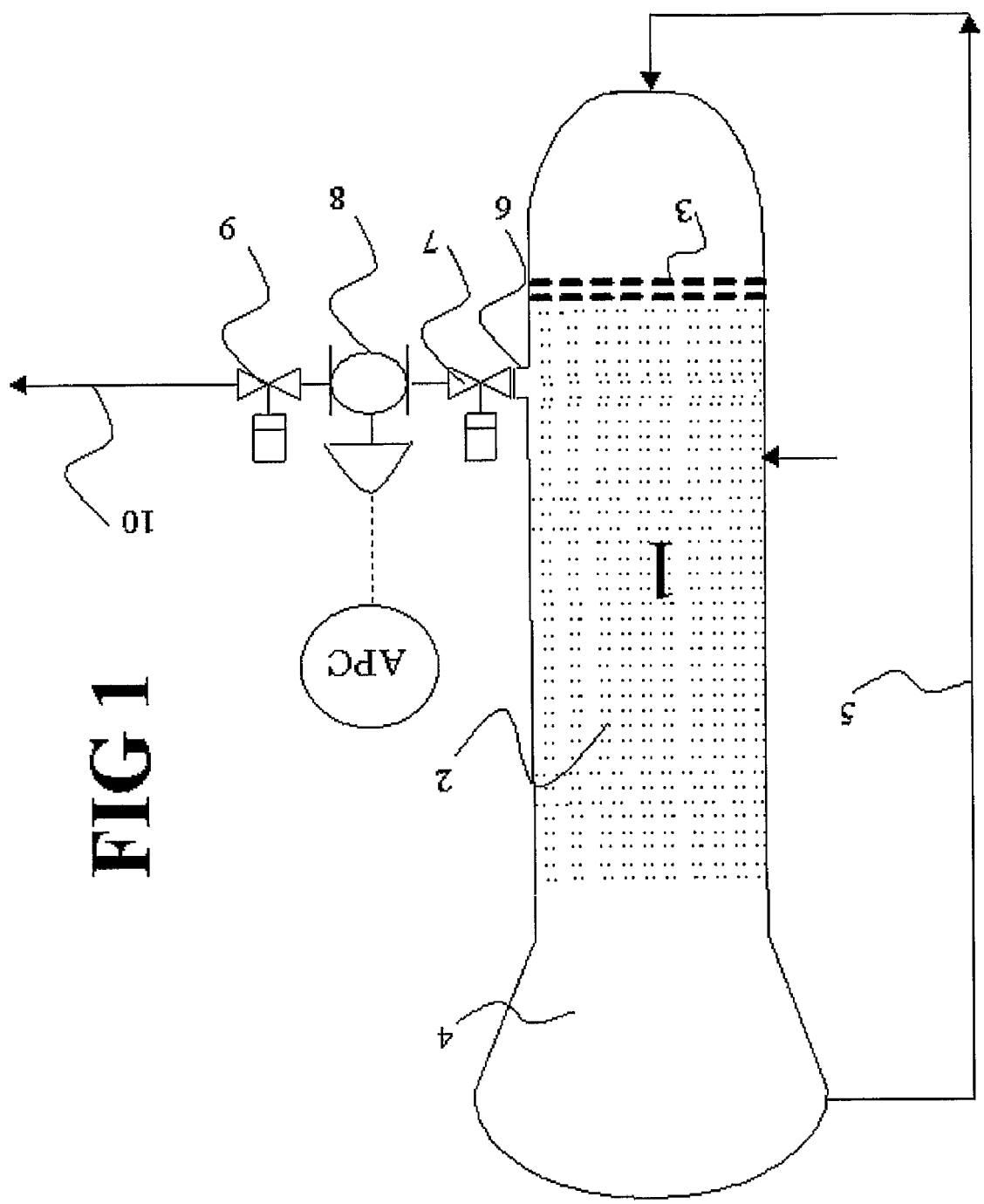
FIG. 1 shows the sequence of valves arranged, according to the prior art, on the discharge line of a polymer withdrawn from a polymerization reactor.

An on-off piston valve 7 is interposed between the discharge nozzle 6 and a ball valve 8 used as a control valve. A second on-off piston valve 9 is provided downstream the ball valve 8. As it is evident from FIG. 1, the flow of polymer particles, before reaching the control valve 8, is obliged to pass through a relatively long piece of pipeline plus at least one on-off valve. As pointed out in the background of the invention, this prior art arrangement gives high risks of formation of polymer agglomerates in the pipeline between the discharge nozzle 6 and the control valve 8.

Figure 2:
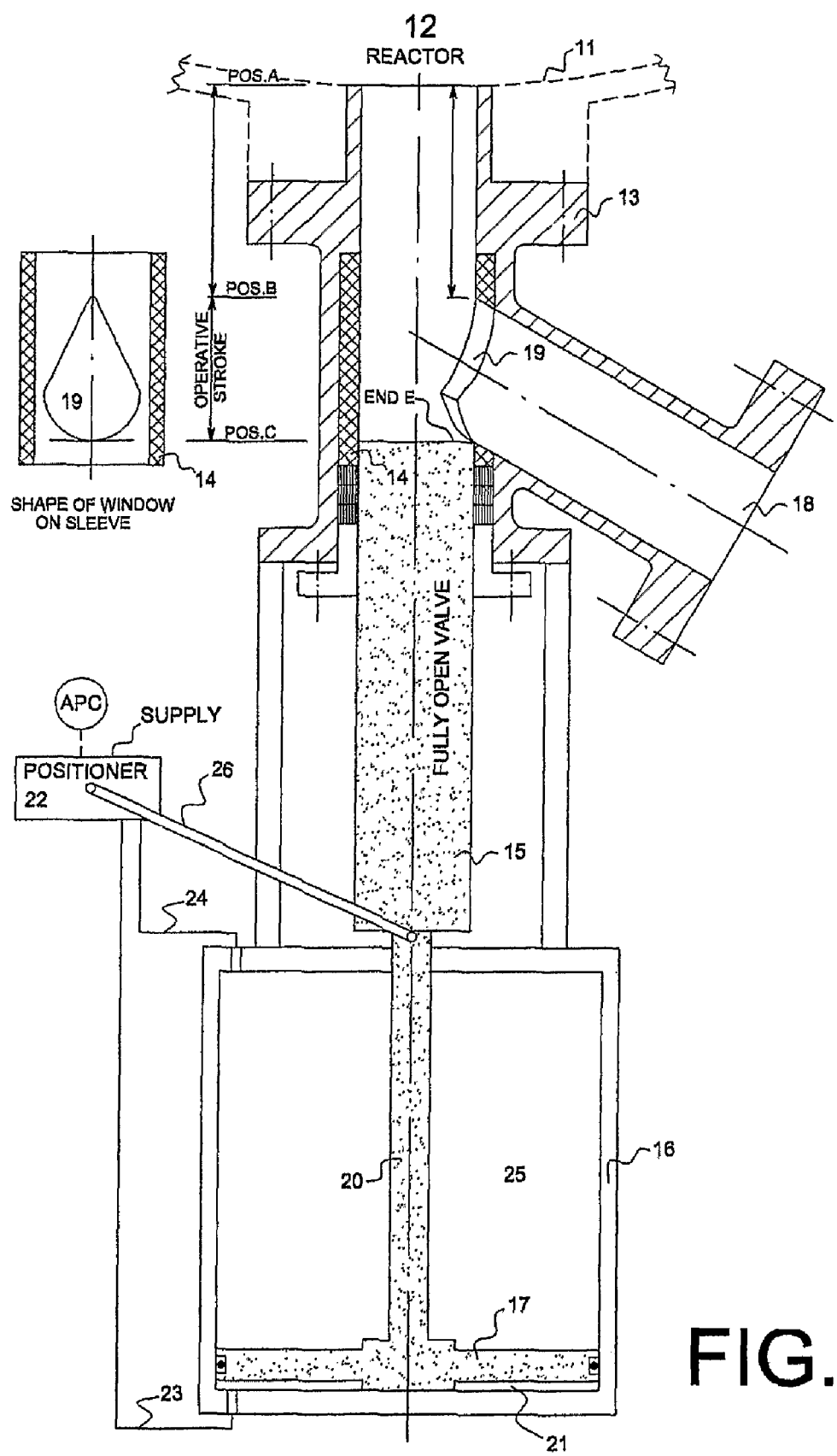
FIG. 2 is a sectional view of a piston valve used for controlling the polymer discharge from a reactor according to method of the invention: the piston valve is illustrated in a fully open arrangement.

FIG. 2 is a sectional view of a piston valve according to method of the invention, where the valve is shown in a fully open operation.

The piston valve is directly flange-mounted on the reactor wall 11 of a polymerization reactor 12. The valve comprises a valve body 13 represented by the hatched section, a piston element 15 and a discharge conduit 18. A sleeve 14 represented by crosshatching is inserted along the valve axis inside the valve body 13. The piston element 15 is a solid cylinder able to slide inside said sleeve 14 and is connected to an actuator 16 able to selectively displace the piston 15 inside the valve body 13, thus modulating its stroke. The piston 15 moves axially through the sleeve 14.

As it can be easily understood by FIG. 2, the relative position of the piston 15 inside the sleeve 14 may cause or not the passage of polymer particles coming from the reactor 12 through the discharge conduit 18. A specially shaped orifice 19 is formed at the intersection between the sleeve 14 and the discharge conduit 18, said orifice 19 being the inlet of the discharge conduit 18. On the left side of FIG. 2 an enlarged view of a possible geometrical profile of said orifice 19 is shown.

For clarity's sake, throughout the present disclosure the term "piston end E" will be referred to the end of the piston 15 facing the reactor wall 11. With reference to the position of said end E during the piston stroke, the following operating positions can be identified:

the position A corresponding to a complete alignment of the piston end E with the reactor wall 11;

the position B where the piston end E starts to uncover the specially shaped orifice 19;

the position C where the piston end E totally oversteps the specially shaped orifice 19.

According to the method of the present invention, the motion of the piston 15 through the sleeve 14 can identify two different portions of stroke. In a first portion AB, comprised between the above defined position A and the position B, the piston stroke is not modulated by the action of the actuator 16. This means that along the portion AB the piston stroke is substantially ineffective and the piston valve does not provide functions of opening or closure: the intermediate positions from A to B are not operative positions.

On the contrary, in the second and successive portion BC of piston stroke, comprised between the position B and the position C, the position of the piston end E causes different levels of opening of the orifice 19, so that the piston stroke is modulated by the action of the actuator 16. Thus, the flow rate of polymer particles leaving the polymerization reactor 12 is adjusted exclusively by the motion of the piston 15 in said second portion BC of piston stroke.

To obtain this technical effect, the piston element 15 is mechanically connected to an actuator 16 which, according to the embodiment of FIG. 2, comprises a second piston 17 and two pressurization chambers 21 and 25. The piston 17 of the actuator 16 is sandwiched between said pressurization chambers 21 and 25. Moreover, the actuator 16 is associated with a valve positioner 22. Of course, the choice of said actuator is not limitative of the scope of the present invention and any actuator able to move back and forth the piston 15 of the valve may be adopted. For instance, the piston 17 of the actuator 16 which can be also hydraulically driven.

The embodiment of FIG. 2 envisages the connection of the stem 20 with a pneumatically driven piston 17, which can move back and forth between the pressurization chambers 21 and 25.

As said, the piston 17 of the actuator 16 is associated with a valve positioner 22, which is an instrument able to control the position of an actuator to position it exactly as dictated by the input signal coming from a process controller. In particular, the positioner 22 receives an electronic or pneumatic signal from an advanced process controller (APC) and compares said signal to the position of the piston 17 of the actuator 16 by means of the positioner link 26. If the received signal and the position of the piston 17 are different, the positioner 22 sends the necessary power, usually through a compressed fluid, to move the piston 17 until the correct position is reached. Generally, the positioner produces an output position according to a 4-20 mA input signal coming from the process controller APC.

Thus, for closing the valve a pressurized fluid, preferably compressed air, coming from the positioner 22 is introduced into the pressurization chamber 21 via line 23.

Viceversa, for opening the valve, compressed air coming from the positioner 22 is introduced via line 24 into the pressurization chamber 25, while compressed air is simultaneously withdrawn from the chamber 21 via line 23.

Any variation of the inputs from the APC to the positioner 22 involves a respective motion of the piston 17 and stem 20 and accordingly, of the piston element 15 inside the valve body 13.

In the arrangement of FIG. 2, the piston end E is in the position C corresponding to a complete opening of the valve.

Figure 3:
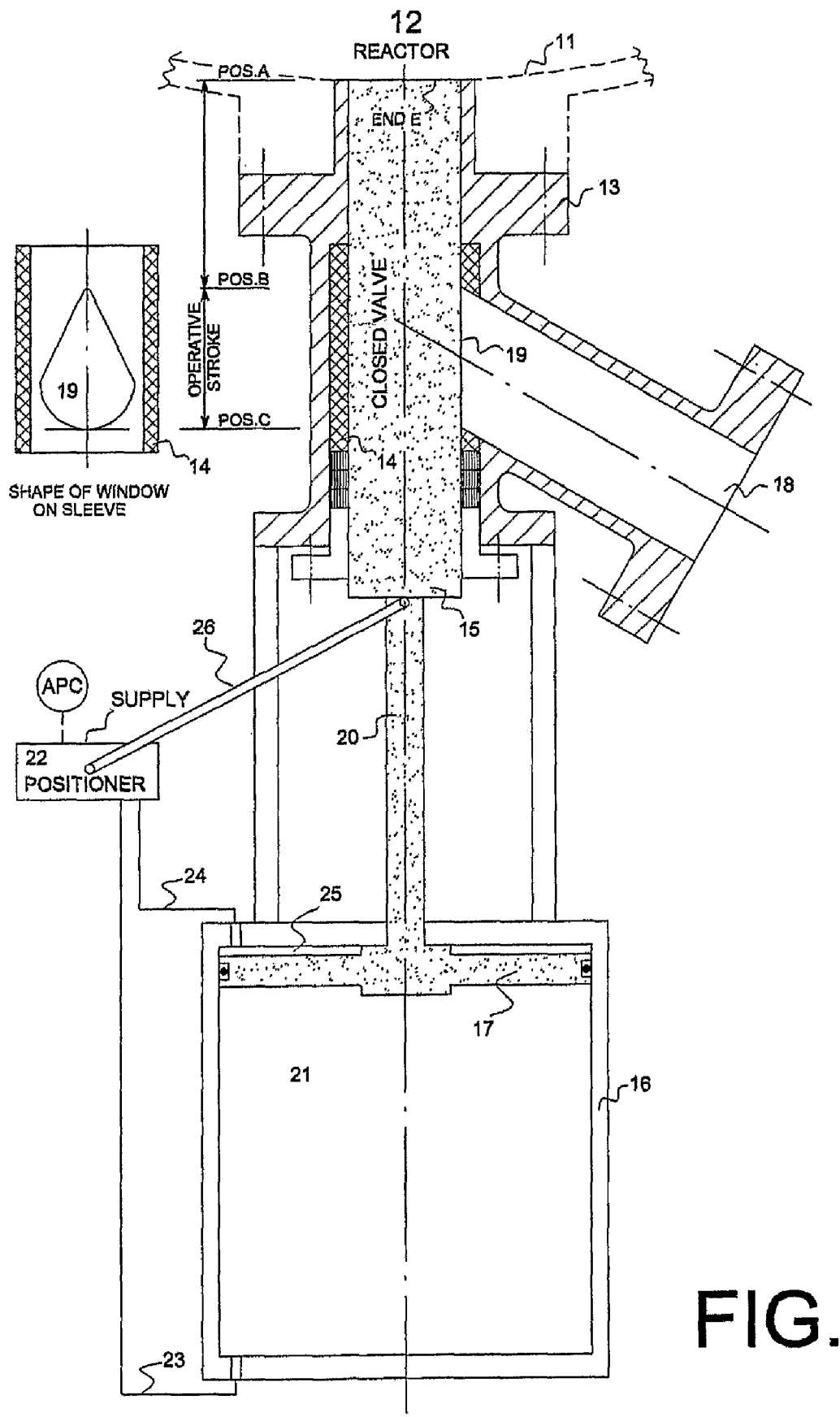
FIG. 3 is a sectional view of a piston valve used for controlling the polymer discharge from a reactor according to method of the invention: the piston valve is illustrated in a totally closed arrangement.

On the contrary, FIG. 3 is a sectional view of the same piston valve of FIG. 2 with the difference that the piston end E is completely aligned with the reactor wall (position A): this corresponds to a complete closure of the valve. The same elements as described in FIG. 2 can be recognized.

According to the method for controlling the polymer discharge of the present invention, the described piston valve can be advantageously operated as an on-off valve as regards the movement of the piston 15 along the portion AB of stroke. Therefore, the positioner 22 can provide a sharp variation of pressure into lines 23 and 24 of connection with the actuator, so as to move quickly the piston end E from the position A to the position B or viceversa. For instance, at a prefixed conventional value $p_o$ of the signal from APC, the piston end E can be at the position A, corresponding to the alignment of the piston end with the reactor wall (complete closing of the valve). A little variation of said signal, for example, an increase or decrease of 5%, can cause a fast movement of the piston 15 up to uncover the specially shaped orifice 19 (position B). As a consequence, raising the need of interrupting the polymer discharge from the polymerization reactor, a complete closing of the valve (position A) will require very short times, in the order of 1-5 seconds. In this case, the movement of the piston 15 pushes quickly the polymer particles back into the reactor, with no chance for the polymer particles of entering the sleeve 14 and plugging the piston valve. Likewise, when the polymerization reactor is started up and the polymer is going to be discharged, very short times are required to pass from a complete closing of the valve to a situation in which the flow rate of discharged polymer begins to be finely controlled (position B): this is the time taken by the polymer to cover the distance AB.

As said, the piston valve of the present invention is advantageously operated as a modulating valve as regards the movement of the piston 15 along the portion BC of stroke. Therefore, starting from the position B, the positioner 22 can provide an increase of the pressure signal such that the progression of the piston along the portion BC is about linear with the signal increase. The relative position of the piston end from B to C causes different levels of opening of the orifice 19, thus modulating the flow rate of polymer particles leaving the polymerization reactor 12 and entering the discharge conduit 18. To make said modulating action as much as possible effective, the orifice 19 has not an elliptic shape, as it would result by the intersection of two hollow cylinders (the sleeve 14 and the discharge conduit 18), but it is formed with a special shape onto the sleeve 14.

FIGS. 2 and 3 show the special geometrical profile of the orifice 19 formed onto the sleeve 14 in correspondence of the inlet of the conduit discharge 18. It may be seen that a first section of said orifice 19, and precisely the one nearer to the reactor wall, is V-shaped and forms a triangle with vertex in B. On the other hand, the remaining section of said orifice 19 has a substantially elliptic shape with C as the end point.

In some cases, depending on the control needs, the stroke of the piston 15 can be optionally stopped before the position C, so that the elliptical portion of the orifice 19 may remain uncovered.

The triangular shape of the first portion allows to achieve a quadratic control characteristic. This reveals an advantage, being said control characteristic nearly equal-percentage: this means that a percentage increase of the pressure signal given by the positioner 22 involves the same percentage increase on the actual flow rate of polymer particles entering the discharge conduit 18.

The triangular shape gives the further advantage of giving a more accurate control on the flow rate of polymer when a low throughput of polymer is discharged from the reactor. In fact, in comparison with the elliptical shape, the V-shape considerably minimizes the amount of polymerization medium which is discharged together with the polymer particles: as a consequence, a minor amount of unreacted monomers has to be recovered and recycled to the polymerization reactor.

The reaction medium withdrawn together with the polymer can be either a liquid or a gas, since the method of the present invention can be successfully applied to polymerization processes carried out both in a liquid-phase or a gas-phase.

Of course, a device for separating the unreacted monomers from the polymer has to be arranged downstream the piston valve of the invention. The choice of said separating devices depends on the liquid or gaseous state of the monomers to be recovered.

As an example of a polymerization process continuously operated in a liquid phase, the discharge method of the invention can be successfully applied to a loop polymerization reactor, wherein the polymerization of one or more liquid monomers brings to the formation of a slurry of polymer particles.

As an example of a polymerization process continuously operated in a gas phase, the discharge method of the invention can be successfully applied to a polymerization reactor having interconnected polymerization zones as described in EP 1012195. Said gas-phase process is carried out in two polymerization zones, wherein the growing polymer particles flow through a first polymerization zone (riser) under fast fluidization conditions, leave said riser and enter a second polymerization zone (downcomer) through which they flow in a densified form under the action of gravity: a circulation of polymer is established between the two polymerization zones. The piston valve of the present invention can be suitably flange-mounted on the reactor wall in correspondence of the bottom part of the downcomer, thus achieving all the advantages inherently given by the method of discharging polymer of the invention.

The method of the invention is likewise suitable to be applied to other gas-phase polymerization reactors, such as fluidized bed reactors and stirred bed reactors. It is another object of the present invention an apparatus for discharging a polymer from a continuously operated polymerization reactor, said apparatus having as main advantages: 1) reducing the risk of plugging the polymer discharge line; 2) carrying out an accurate and prompt control on the flow rate of discharged polymer.

Therefore, the present invention further provides an apparatus for discharging polymer from a continuously operated polymerization reactor, wherein at least one monomer is polymerized in the presence of a polymerization catalyst, the apparatus being represented in FIG. 2 or 3 and comprising:

a piston valve flange-mounted on the wall 11 of a polymerization reactor 12 or in its close proximity, said piston valve having a piston element 15 able to slide inside the valve body 13;

an actuator 16 connected to said piston element 15, said actuator 16 being able to modulate the stroke of the piston element 15 inside the valve body 13.

a valve positioner 22 associated with said actuator 16.

The piston valve of the discharge apparatus of the invention preferably includes a sleeve 14 inserted inside the valve body 13 and a discharge conduit 18, which forms an angle from 30° to 90° with the valve axis, preferable said angle being from 40° to 60°. Furthermore, the piston valve further comprises a specially shaped orifice 19, which is formed at the intersection between said sleeve 14 and the discharge conduit 18.

For the reasons and advantages above explained, the first section of said specially shaped orifice 19, and precisely the one nearer to the reactor wall, is V-shaped. The remaining section of said orifice 19 has a substantially elliptic shape.

The invention claimed is:

1. A method of discharging polymer from a continuously operated polymerization reactor comprising a wall, wherein at least a monomer is polymerized in a polymerization process to form polymer particles, the method comprising adjusting a discharge rate of the polymer particles by means of a piston valve having a piston element connected to an actuator, said actuator being able to modulate a piston stroke comprising a first portion AB and a second portion BC inside said piston valve, wherein said piston valve is directly flange-mounted on the wall of said polymerization reactor.

2. The method according to claim 1, wherein the polymerization process is carried out in a gaseous phase.

3. The method according to claim 1 wherein the polymerization process is carried out in a liquid phase.

4. The method according to claim 1, wherein said piston valve comprises:

an axis;

a valve body wherein the piston element is able to slide inside said valve body;

a discharge conduit comprising an axis; and an orifice forming an inlet of said discharge conduit, the orifice comprising a first section and a remaining section, the first section being closer to the reactor wall.

5. The method according to claim 4, wherein a sleeve is inserted inside the valve body.

6. The method according to claim 5, wherein said piston element is a solid cylinder able to slide inside said sleeve.

7. The method according to claim 4, wherein the axis of said discharge conduit forms an angle from 30° to 90° with the axis of the valve.

8. The method according to claim 7, wherein the axis of said discharge conduit forms an angle from 40° to 60° with the axis of the valve.

9. The method according to claim 1, wherein the first portion AB of the piston stroke, comprised between a position A wherein piston end E is in complete alignment with the reactor wall and a position B wherein the piston end E starts to uncover said, the piston stroke is not modulated by the action of said actuator.

10. The method according to claim 9, wherein the second portion BC of the piston stroke, is comprised between said position B and a position C wherein the piston end E totally oversteps the orifice, and the piston stroke is modulated by the action of said actuator.

11. The method according to claim 1, wherein said actuator is associated with a valve positioner.

12. The method according to claim 11, wherein said positioner produces an output position according to a 4-20 mA input signal coming from a process controller.

13. The method according to claim 12, wherein said positioner provides a sharp variation of pressure signal into the lines of connection with said actuator, so as to move quickly the piston end E from said position A to said position B or from said position B to said position A.

14. The method according to claim 13, wherein said positioner provides an increase of the pressure signal such that a progression of the piston along the portion BC of stroke is linear with the signal increase.

15. The method according to claim 4, wherein the first section of said orifice is V-shaped and forms a triangle with a vertex in a position B, wherein the piston end E starts to uncover the orifice.

16. The method according to claim 4, wherein the remaining section of said orifice has a substantially elliptic shape.

17. The method according to claim 1, wherein said continuously operated polymerization reactor is a slurry loop reactor.

18. The method according to claim 1, wherein said continuously operated polymerization reactor is a gas-phase reactor having interconnected polymerization zone.

* * * * *